(12) United States Patent
Clark

(10) Patent No.: US 12,695,499 B2
(45) Date of Patent: Jul. 28, 2026

(54) OFFSET AND REDUCED SIGNATURE COMMUNICATION

(71) Applicant: Brendan E. Clark, Rocky River, OH (US)

(72) Inventor: Brendan E. Clark, Rocky River, OH (US)

( * ) Notice: Subject to any disclaimer, the term of this patent is extended or adjusted under 35 U.S.C. 154(b) by 85 days.

(21) Appl. No.: 18/536,239

(22) Filed: Dec. 12, 2023

(65) Prior Publication Data

US 2024/0406734 A1      Dec. 5, 2024

Related U.S. Application Data

(60) Provisional application No. 63/504,771, filed on May 29, 2023.

(51) Int. Cl.
| | |
|---|---|
| *H04B 7/185* | (2006.01) |
| *G05D 1/226* | (2024.01) |
| *G05D 1/46* | (2024.01) |
| *H04W 12/50* | (2021.01) |
| *B64U 101/00* | (2023.01) |
| *B64U 101/20* | (2023.01) |
| *G05D 105/35* | (2024.01) |
| *G05D 109/22* | (2024.01) |

(52) U.S. Cl.
CPC ......... *H04B 7/18504* (2013.01); *G05D 1/226* (2024.01); *G05D 1/46* (2024.01); *H04W 12/50* (2021.01); *B64U 2101/00* (2023.01); *B64U*

*2101/20* (2023.01); *B64U 2201/00* (2023.01); *G05D 2105/35* (2024.01); *G05D 2109/22* (2024.01)

(58) Field of Classification Search
None
See application file for complete search history.

(56) References Cited

U.S. PATENT DOCUMENTS

| | | | |
|---|---|---|---|
| 2003/0164794 A1* | 9/2003 | Haynes | H04B 7/18504 |
| | | | 342/353 |
| 2004/0059914 A1* | 3/2004 | Karaoguz | H04W 12/08 |
| | | | 713/168 |
| 2019/0044609 A1* | 2/2019 | Winkle | H04B 7/1856 |
| 2023/0223983 A1* | 7/2023 | Yaskoff | H04B 1/7103 |
| | | | 375/144 |

FOREIGN PATENT DOCUMENTS

| | | | | |
|---|---|---|---|---|
| EP | 4210233 A2 * | 7/2023 | | H04B 1/69 |

* cited by examiner

*Primary Examiner* — Peter D Nolan
*Assistant Examiner* — Michael F Whalen

(57) ABSTRACT

Various techniques can be utilized to emit a signal away from the entity generating the signal or otherwise reduce the signature in the electromagnetic spectrum of an entity in communication with another entity at a distance. Static and mobile air, land, and sea-based assets can be used with combinations of physical, wired, and wireless interactions.

20 Claims, 10 Drawing Sheets

OFFSET AND REDUCED SIGNATURE COMMUNICATION

FIELD OF INVENTION

The disclosure generally pertains to the transmission of signals, and more particularly toward transmitting or retransmitting signals from a location while minimizing the detectability of that location.

BACKGROUND

The twentieth century brought about an explosion in wireless communication. Mere decades after the first experimental radios broadcast of Morse code over radio waves, radios capable of transmitting and receiving voice signals were in common use. As electronics became more complex, new ways to transmit information wirelessly emerged. Most if not all elements of society are now to some extent reliant upon wireless communication.

One drawback of wireless communication is that a user providing information must emit, thereby becoming detectable or "visible" in the electromagnetic spectrum. This potentially exposes the user to detection and tracking, which inheres a litany of privacy and safety concerns.

One area where risk of detection is significant is in military operations. Many modern militaries, and even some irregular, non-state entities, possess the capability to detect and intercept emissions. Belligerents will use the information learned to eavesdrop or decrypt the transmissions as well as locate—and potentially target—the sources of those emissions. The threat extends beyond purely tactical communications networks as militaries have located and even attacked targets based on commercial cellular telephone network traffic.

Modern military concepts paradoxically necessitate that military assets, which are capable of being targeted when emitting, emit to achieve their mission. For example, the U.S. Marine Corps' concepts of Expeditionary Advanced Base Operations (EABO), Distributed Operations (DO), and Stand-In Forces (SIF) are dependent upon troops well inside enemy threat rings communicating with others inside and outside those threat rings. Military modernization also dictates that increasingly large amounts of data will be shared among an increasingly large number of recipients as smaller units gain access to more resources and function as real time sensors for themselves or other units.

As technology advances, the accessibility of equipment and software to detect, intercept, locate, and track broadcast signals and emitters will only become more accessible. Already, a variety of hostile actors who pose a threat (physical or otherwise) to civilian authorities and even individual private citizens now possess the technology to exploit the signature of those entities in the electromagnetic spectrum (EMS) when those entities use wireless communication.

To date, the response to these threats has been to improve encryption or reduce emission times (e.g., by broadcasting in short bursts). However, this does not ultimately prevent the creation of a locatable signatures in the EMS.

SUMMARY

In embodiments, a retransmitter can receive a low-power, limited-observability, or non-observable signal, and retransmit that signal to reduce the likelihood that an origin of a signal is detected or located. Various techniques disclosed herein provide additional protections for the origin, retransmitter(s), and/or recipient(s) to reduce detectability and increase survivability.

Aspects described in this summary are intended for purposes of example only, and should not be interpreted to limit the scope or spirit of the entirety of the disclosure or claims in any way.

The drawings are intended for purposes of example only, and should not be interpreted to limit the scope or spirit of the entirety of the disclosure or claims in any way.

DETAILED DESCRIPTION

Figure 1A:
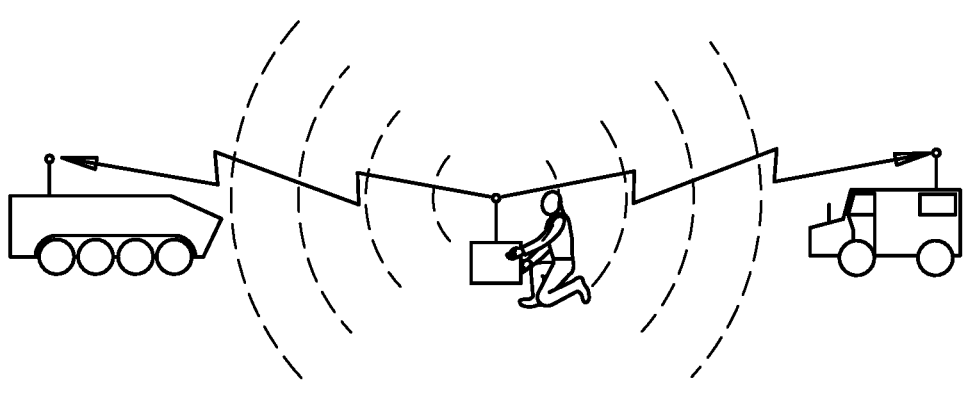
FIG. 1A illustrates an example of an omnidirectional or undirected antenna transmitting.

FIG. 1A illustrates an example of an omnidirectional or undirected antenna 110 transmitting. As can be appreciated, when an entity (e.g. 110) emits, the emission may be detected by friendly units 112 in one direction, but may also be detected by enemy units 114 in another direction. This enables the enemy 114 to intercept, attempt to read, and jam the signal, as well as locate or target the emitter (e.g., 110), along with various other undesirable possibilities.

Figure 1B:
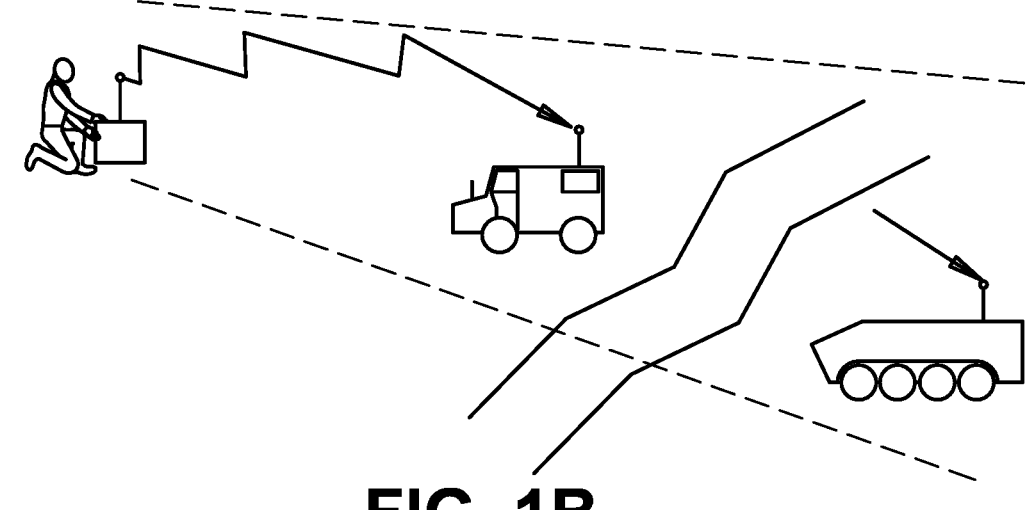
FIG. 1B illustrates an example of a directional antenna transmitting.

FIG. 1B illustrates an example of a directional antenna 120 transmitting. As can be appreciated, when an entity (e.g. 120) emits, the emission may be detected by friendly units 122 in the direction of the antenna, but may also be detected by enemy units 124 in the same or a similar direction, or other directions to the extent that a reduced signature is still detectable from more than one angle. This enables the enemy 124 to intercept, attempt to read, and jam the signal, as well as locate or target the emitter (e.g. 120), along with various other undesirable possibilities.

Figure 1C:
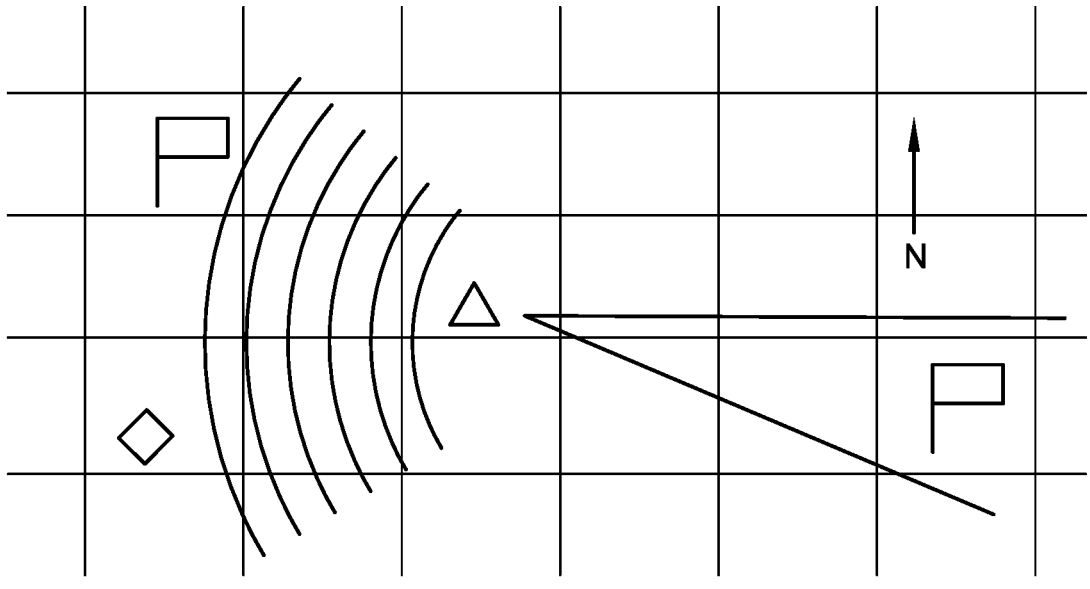
FIG. 1C illustrates another example of an omnidirectional or undirected antenna transmitting.

FIG. 1C illustrates another example of an omnidirectional or undirected antenna 130 transmitting. As can be appreciated, when an entity emits, the emission may be detected by friendly units 132 in one direction, but may also be detected by enemy units 134 in another direction. This enables the enemy 134 to intercept, attempt to read, and jam the signal, as well as locate or target the emitter (e.g., 130), along with various other undesirable possibilities.

The disclosure describes a variety of ways to defeat, or at least reduce the risk of, location of an emitter by way of reducing the signature of the emitter and chaining communications through one or more retransmitters. Particularly, unmanned aerial vehicles ("UAVs") or other vehicles can be outfitted with retransmission apparatuses (collectively, "retrans vehicles"). Unmanned retrans vehicles can be "attritable," e.g., made comparatively low cost and replaceable so that more than one is available to an entity in the event of loss. In embodiments, a kit can be provided to integrate retransmission equipment on aging UAVs, aircraft, vehicles, et cetera, to allow for use of systems facing retirement as attritable retrans vehicles. The retrans vehicles can be equipped with one or more emitters to broadcast to receivers inside enemy threat rings or at longer distances such that the retrans vehicle, rather than the humans or equipment collecting information for transmission, will be more likely to be detected by threats (if threats detect anything at all), and the originator of a signal will be less likely to be detected. The retrans vehicles can be launched with information for broadcast aboard, receive information for broadcast via a wired connection at a certain location, or receive information from a directional or lower-power emitter that can have a smaller signature than the retrans vehicle emitter. Retrans sites can also be used in connection with or separately from retrans vehicles. Further, groups of retrans sites or vehicles can be used, and one or more may utilize low-observability communication techniques to allow for "chaining" of low power, directional, or other communication means that reduce the likelihood of detection but might not be able to communicate with a desired recipient absent such retransmission.

Because retrans vehicles are only retransmitting a signal from a location offset from the signal's actual origin, there need for decryption and reencryption may be obviated. That is to say, an encrypted signal can be provided to the retrans vehicle and emitted from the retrans vehicle without the need for hardware or software to decrypt and/or reencrypt a signal aboard the retrans vehicle. This prevents a "COM-SEC" breach that could compromise sensitive cryptographic information if the retrans vehicle is compromised or recovered by a belligerent entity.

In the alternative, cryptographic fills (e.g., hopset, transmission security key, transmission encryption key, time hack, network identifier) can be provided on a retrans vehicle, but can automatically zeroize (e.g., erase or destroy cryptographic assets) based on the failure of a condition. Example conditions for zeroizing can include but are not limited to damage to the retrans vehicle, tampering with the retrans vehicle, rules relating to detection of threats, rule relating to battery levels or resources, rules relating to radio checks or heartbeats, receipt of approval or continuation signals from an operator or manager, and various other rules.

Examples of rules relating to detection of threats can include the detection of another vehicle within a certain distance (e.g., 100 m, 400 m, 1 km, et cetera); detected aggression against the retrans vehicle, e.g., detected fire in the vicinity of the retrans vehicle; message to retrans vehicle regarding observed fire in the vicinity of the retrans vehicle; evasive action taken by the retrans vehicle or an instruction to the retrans vehicle to take evasive action; the use of flares or chaff by the retrans vehicle (or an instruction to do so) or by other vehicles in the vicinity of the retrans vehicle; detected radar signals observing the retrans vehicle; detected attempts to jam, spoof, or intercept the retrans vehicle (physically or electronically); et cetera. In embodiments, retrans vehicles can have a threat evasion logic which receives sensor data (from sensors onboard the retrans vehicle or sensors in communication with the retrans vehicle) to determine the likelihood of a threat and causes the retrans vehicle to change directions, location, operating mode, et cetera, to reduce its risk of destruction, interception, neutralization, et cetera.

Examples of rules relating to battery or resources can be a rule for the retrans vehicle to zeroize if its fuel or battery level falls below a threshold, if it is failing to recharge or refuel, if the rate of change of battery or fuel level exceeds a threshold, et cetera. For battery or fuel level based rules, a threshold can be static (e.g., zeroize if battery or fuel falls below 5%, 10%, 20%, 30%, et cetera) or dynamic (e.g., zeroize if insufficient battery to return to an origin or recovery location; zeroize if rate of radio traffic is projected to exhaust battery within 30 minutes).

Rules relating to radio checks or "heartbeats" can involve the retrans vehicle communicating with another system (e.g., entity, beacon, other vehicle) at predetermined intervals (e.g., regular, irregular, random, on the occurrence of an event) to establish that it is still operational (or partially operational) and receiving a response to verify that it should continue operating rather than zeroize cryptographic assets. In event-based heartbeat arrangements, the event can be, e.g., increase or decrease in amount of radio traffic, detected or observed aggression against the retrans vehicle, physical impacts or other physical damage to the retrans vehicle, the initiation or termination of an electronic warfare (EW) attack against the retrans vehicle or radio network in which the retrans vehicle communicates (e.g., attempts to commandeer or breach equipment, jamming, spoofing, indication of unauthorized stations on the net), or any other occurrence that increases the risk that the retrans vehicle is compromised (including being compromised remotely) or captured. In embodiments, any cryptographic information aboard a retrans vehicle can be isolated in storage (e.g., computer-readable media) such that it cannot be accessed remotely.

In embodiments, multiple batteries and fuel sources can be provided, with certain batteries or fuel sources dedicated to powering and controlling the retrans vehicle, and other batteries and/or fuel sources dedicated to broadcasting radio messages. In embodiments, the different fuel sources and/or batteries can be linked, allowing sharing or cannibalization if needed, or segregated, such that the retrans cannot cannibalize resources for system operation (e.g., mobility, control, navigation, survivability), and vice versa.

In embodiments, retrans vehicles may be able to self-sustain (at least in part or for a period of time). For example, solar panels can be utilized to charge retrans vehicle batteries. In embodiments, recharging or refueling points can be provided for the retrans vehicles. In embodiments, recharging or refueling points can be autonomous such that no personnel need be present when the retrans vehicle operatively couples with the equipment to restore resources.

In embodiments, the retrans vehicle can utilize random or offset travel paths to travel to a recharging/refueling site or return to another friendly site. In embodiments, the retrans vehicle may fly at a detectable level to one or more waypoints then drop below or stay above detectable levels to other waypoints. In embodiments, a retrans vehicle may use terrain to mask it from radar or other means of detection in a given direction with intervening terrain. In embodiments, a retrans vehicle may travel to or loiter in holding areas where the retrans vehicle is protected from detection or attack. In embodiments, a retrans vehicle may be designed not to return to any friendly position (or any position within range of a known friendly position or area) to avoid revealing any friendly positions in the event the retrans vehicle has been identified or tracked. A retrans vehicle may go into an idle state (including, e.g., an aerial retrans vehicle landing and/or ceasing transmissions) and later return to movement and/or transmission to decrease its visibility to enemies, to preserve resources, to recharge (when such capabilities are aboard the retrans vehicle), et cetera.

In embodiments a retrans vehicle can be cached (e.g., by traveling to a location, by being dropped in a containerized arrangement, by being emplaced by another system or human) and later activated based on time or condition. The condition can be, e.g., a signal indicating to activate; the absence of a signal indicating it should not activate (e.g., heartbeat signal from another retrans vehicle where the absence of the heartbeat suggests a loss of the vehicle and a need for another vehicle); detection of movement, transmissions, vehicles, weapons discharge, et cetera, in an area; the loss of a different retrans vehicle or site; et cetera.

In embodiments, the retrans vehicle can receive information from a source via a directional transmission or narrow energy beam with limited or no detectable EMS signature. In embodiments, the retrans vehicle can receive information from a source via communications employing Low Probability of Intercept/Low Probability of Detection (LPI/LPD) waveforms. In embodiments, the narrow beam can be a radio wave, laser, or other light or optical technology. To receive this data, the retrans vehicle can loiter in a specific area. In embodiments, the retrans vehicle can loiter indefinitely. In embodiments, the retrans vehicle can relocate after receiving a transmission. In embodiments, the retrans vehicle can relocate after retransmitting a transmission. In embodiments, the retrans vehicle can relocate after a period of time or another condition.

In embodiments, an offset "antenna" may broadcast an audible signal using a speaker. For example, an audible transmission (e.g., morse code or other audible codes) may be undetectable to an enemy despite the noise due to distance (e.g., transmitting across a distant island or open ocean), whereas a transmission in the electromagnetic spectrum could be detectable. In embodiments, an audio signal used to provide information to a retrans vehicle or end recipient (receiving with, e.g., a standard microphone, a parabolic microphone) can utilize audio signals to perform a handshake similar to modems in communication over public switched telephone networks. The handshake can be used to identify a signal to utilize, define signal parameters, and/or determine signal quality. In embodiments a location of an offset signal emitter or retrans vehicle broadcasting an audible signal can be known and a parabolic or other directional microphone can be directed toward the offset signal emitter or retrans vehicle can be pointed or maintained in a direction of the audio signal.

In embodiments, the retrans vehicle can travel a path wherein some or all of the path is within a transmission range of an information source (e.g., troops on the ground, a static (e.g., not moving even if capable of being moved) terrestrial emitter, a sensor node). In embodiments, such a path can be irregular or random. To ensure that information for retransmission is received using directional, lower power, or narrow beam transmissions, the information source emitter can be tuned to point to the retrans vehicle (either by line of sight or using appropriate frequency transmissions) in real-time based on information about the path. In embodiments, the path may be based on a cryptographic asset. The cryptographic asset defining the path can be distinct from and unrelated to cryptographic assets used in transmitting/retransmitting information from the information source. A retrans vehicle can travel a path within a particular arc or area to remain within a range of a direction of a direction antenna (e.g., similar to a final attack heading). Mobile or motorized antennae can be actuated to remain pointed at a retrans vehicle from the emitter side or toward an emitter from the retrans vehicle side.

In embodiments, a path of travel of the retrans vehicle can be based on a cryptographic key and/or a hopset. A retrans vehicle can vary its attitude, altitude, speed, or other parameters based on a cryptographic key and/or hopset, and/or changes therein or thereto. In this manner, a system with a directional antennae can use a cryptographic key or hopset to determine how to transmit (or better transmit) to the retrans vehicle.

In embodiments, an antenna (on a retrans vehicle, at a retrans site, or at an emitter) can be configured to automatically direct itself toward a signal origin or destination. For example, where a retrans vehicle path is known (based on, e.g., preprogramming or route planning based on cryptography or other known factors), an emitter or intermediary retrans vehicle or site can have a controller for controlling a motorized or powered electrical antenna that automatically directs itself toward a moving recipient. In an embodiment, a mobile retrans vehicle can have a directional antenna controlled by a controller to automatically point itself toward a signal origin. In embodiments, control of a retrans vehicle antenna direction (separate from control of the retrans vehicle location and orientation) is based on a known signal origin location. In embodiments, the retrans vehicle can detect a signal and vary its antenna position, measuring signal gain normalized for the moving location of the retrans vehicle, to determine an antenna direction or approximate a signal origin location to control antenna direction or positioning for improved reception.

In embodiments, a location function (defining a current or next position of a retrans vehicle, or in the alternative describing a heading and speed of the retrans vehicle) can provide a continuous series of points, e.g., plotting a smooth, continuous curve, to define a complete path for the retrans vehicle. In alternative embodiments, a location function need not be continuous but defines locations or zones that the retrans vehicle should be in or near at a specific time. Functions can be constrained or given modified inputs based on feedback to ensure the feasibility of retrans vehicle adherence to the calculated location. In an embodiment, if a retrans vehicle is off or behind its calculated location, the function can advance nonlinearly or be given different inputs to allow the retrans vehicle to "catch up" if it is falling out of pattern. In this way, directional antennae or other communication means dependent upon vehicle location can consistently orient on the retrans vehicle. The function can be known by users of the retrans vehicle (e.g., those providing a signal for the retrans vehicle to retransmit), and can include cryptographic elements, or receive encrypted inputs or provide encrypted outputs, for security. In embodiments, multiple functions can be used. For example, different functions can be used to define altitude, latitude, and longitude, or other components, in multidimensional space over time, and/or location (or similar) functions can be cycled or hopped for security. In embodiments, two or more encryption algorithms can be used to encrypt different components of the retrans vehicle's location or travel (e.g., latitude, longitude, altitude, speed, direction, et cetera).

In embodiments, the travel of travel of the retrans vehicle can be based on being within a zone (defined by, e.g., distance from a waypoint, within a geofenced area, within a two- or three-dimensional space defined by three or more waypoints, within an angular range (e.g., not more than a threshold number of degrees or mils off a line given an origin), as measured from a known point, et cetera) during a time period. The time period can be for a mission length, during communication time windows, event-dependent (e.g., change to mission, loss of one or more other retrans vehicles, loss of communications, et cetera) or other periods. More than one type of zone can be used by a single retrans vehicle. For example, a retrans vehicle can remain within a radius of a waypoint during a first period of a mission, and within a defined three-dimensional space during a second period of a mission. In embodiments, routes traveled within a zone can be randomized or erratic to reduce enemy targeting capability. In embodiments, a retrans vehicle can be configured to remain in positions or zones where the retrans vehicle can receive transmissions from two or more transmitters. The retrans vehicle's "knowledge" of these transmitters can be preprogrammed, based on received transmissions, based on a handshake or authentication from a signal origin, et cetera.

As discussed, a retrans vehicle can authenticate a signal, or pair with an emitter, before retransmission or signal repetition is completed. In this way, a retrans vehicle can avoid becoming congested with traffic and resist jamming. Such authentication can include the use of handshakes, keys, encryption, transmission headers or predicates, et cetera, such that transmissions from known sources can be actioned while others can be ignored.

In embodiments, a retrans vehicle may control its position in part to maintain communication links with one or more transmitters. In embodiments, a retrans vehicle may detect a signal that is weakening or dropping as a result of its positional changes, and can proceed in a direction improving the communication link. In embodiments, an algorithm can be provided (e.g., aboard the retrans vehicle or using a system in communication with the retrans vehicle) that utilizes the strength or fidelity of one ore more signals transmitting to the retrans vehicles as inputs to a location function, or otherwise resolve solutions for the retrans vehicle location that allow the retrans vehicle to self-manage to maximize its utility among two or more transmitters seeking to use its retransmission capability. In embodiments, a different location function, preprogrammed route, or other technique can allow an emitter to securely determine the location or area of a retrans vehicle.

In embodiments, a retrans vehicle can be given constraints within the zone or travel route for location, speed, altitude (where relevant), et cetera, to provide the desired communication capabilities, deconflict the retrans vehicle from other traffic, the effects of ordnance, or other hazards to communication capabilities or device health (e.g., weather, interference, et cetera).

In embodiments, a path of travel for a retrans vehicle can be preprogrammed, with the path known to one or more entities that may leverage the retrans vehicle. In embodiments, multiple paths can be preprogrammed and a path can be selected based on a parameter. The various entities that may use the retrans vehicle for retransmitting a signal can accordingly track the retrans vehicle to provide improved communication with directional or low power emitters.

In embodiments, a method of using a retrans vehicle can include prepositioning one or more retrans vehicles. Prepositioning a retrans vehicle can be conducted under the retrans vehicles' own power, by delivery from another entity (e.g., airdrop, launch at sea, placement by ground vehicles or troops, deployed from a satellite or high-altitude aircraft), or a combination of both.

In embodiments, self-deploying retrans sites (distinct from retrans vehicles) can be prepositioned. Popup retransmitter-antenna combinations with power supplies or renewable power aboard can be deployed throughout and area. In embodiments, such packages could include features to self-right (using, e.g., mechanical arms, thrusters, ground detection, floats, weighting, biasing, et cetera), open, and deploy automatically. This could be done immediately on placement, after the expiration of a timer, on event, or on another basis. In embodiments, a plurality of such packages can be deployed on staggered timers to create a geographically cycling set of retransmitters emitting from different locations to increase the difficulty and cost of location and/or destruction. In embodiments such packages can be self-deployed and operational for overlapping periods of time to provide redundant retransmission in the event of one's failure or destruction. Retrans sites can toggle on, off, and on again based on time, conditions described herein, power status or recharging, et cetera. In embodiments, a condition for powering on a retrans site is the loss of a "live" retrans site or vehicle (e.g., one that was operating or in use until the loss). In embodiments, a retrans vehicle (or retrans site) can have a unique code assigned that can be sent as a "wakeup" prefix with instructions to power on an inactive site that is only passively monitoring traffic for instructions.

In embodiments, spoofing vehicles can be employed. Spoofing vehicles can emit signals similar to those emitted by retrans vehicles or information sources (e.g., similar spectrums, broadcast strengths, broadcast directions, frequency hopping rate, or other radio or transmission specifications) to attract the attention of a belligerent to reduce the likelihood of detection of a retrans vehicle, or to deceive the enemy in the absence of an emitting information source or retrans vehicle.

In embodiments, a retrans vehicle can operate in one of multiple modes. The modes can include passive (capable of receiving but not transmitting), retransmitting continuously, retransmitting during transmission windows, retransmitting while weighting maneuver for signal quality, retransmitting while weighting maneuver for survivability, retransmitting while weighting maneuver for a balance of signal quality and survivability, spoofing, et cetera.

A retrans vehicle may function as a spoofing vehicle in a spoofing mode and/or separate spoofing vehicles can be utilized. In embodiments, directional beams can be transmitted in multiple or irrelevant directions to reduce the likelihood that a single directional signal can be detected to "point to" a friendly unit. Spoofing emissions can be broadcast separate from actual transmissions to increase the difficulty of identifying authentic communications. Where a retrans vehicle can be observed, its travel and sensors can be periodically directed to suggest communication to and from directions where no authentic communication is originating or terminating.

In embodiments, ad hoc repeater or retransmission networks can be established using a plurality of vehicles. In embodiments two or more retrans vehicles can coordinate transmission times (which can be simultaneous, sequential, partially simultaneous, partially sequential, or any variant thereof) to present two or more emitters, or cycle between emitters in different locations, to confuse or confound enemy countermeasures.

In embodiments, a retrans vehicle can be a submersible waterborne vehicle. In embodiments, the submersible waterborne vehicle is configured to receive a sonar signal. The sonar signal can be emitted from a transmitter in wired or wireless communication with a user ashore, afloat, in the air, or under the water's surface. In embodiments, the sonar can be configured to communicate between the water-air barrier by transmitting a sonar signal that can be received at the water's surface and interpreted for retransmission. In embodiments, a sonar signal can carry information using a variety of techniques to represent data in a manner where it can be interpreted by a receiver, such as, e.g., binary, morse code, according to modem protocols, et cetera.

In embodiments, a data payload can be loaded to a vehicle or device that does not emit until it has traveled a certain distance. In embodiments, the vehicle or device can be, e.g., an unmanned vehicle (e.g., aerial, terrestrial, surface, subsurface). In embodiments, the unmanned vehicle can be a balloon or unpowered surface vehicle that moves according to currents.

In embodiments, a transmission to be received by a retrans vehicle can include a header or similar sub-transmission with each transmission to specify a delivery priority. In this manner, certain transmissions can be delayed or cached to allow for a retrans vehicle to relocate between transmissions or only transmit from survivable locations. For example, a routine radio check can be received at one location and retransmitted from another, but an urgent request can be immediately retransmitted.

In embodiments, the location of one or more retrans vehicle(s) or one or more retrans site(s) can be greater than or equal to a risk estimate distance ("RED"), estimated casualty radius ("ECR"), surface danger zone ("SDZ") or similar measure. Such measures can be referred to herein as "friendly standoff." The friendly standoff can be calculated for a particular piece of enemy ordnance, or can be based on a worst case scenario, e.g., relevant ordnance with the largest friendly standoff (e.g., largest conventional munition in enemy inventory, largest munition used in theater, largest munition believed to be logistically supportable or deliverable, et cetera). In embodiments, a friendly standoff used herein can also factor in enemy tactics or employment considerations, such as the number of firing units and sheaf, tactics such as search and traverse missions, range and deflection probable errors (both on an initial volley and during the conduct of the mission), the number of munitions expended in different types of firemissions (e.g., immediate suppression, fire for effect), et cetera, to allow the friendly standoff used to extend to more than a single munition's RED/ECR/SDZ. For example, an enemy aware of an offset antennae may seek to destroy the offset antennae but also a low- or no-signature unit utilizing the offset antennae. They may therefore use munitions such as artillery, naval surface fires, or missiles to attack an area. The enemy may be known to employ a tactic involving firing 16 munitions seeking to impact an area centered on the offset antennae, calculated to impact in a sheaf spaced approximately according to the munition's ECR. Based on weapon-specific, average, or worst-case probably error, further distance can be added to calculate the friendly offset to account for munitions at the outer edge of the sheaf landing long, short, left, or right. Vehicles given constraints describing these possibilities can be configured using onboard or remote logic to self-manage their location (e.g., latitude, longitude, altitude) for survivability to remain away from threats or leave threat areas on occurrence of a condition (e.g., detection of impacts, detection of munitions in the air, detection of radar or enemy emissions, et cetera).

In embodiments, the retrans vehicle(s) and/or the retrans site(s) can prevent or cease broadcasting if an origin of a friendly unit is within the friendly offset (whether the broadcasting unit or any other). In embodiments, the retrans vehicle(s) and/or the retrans site(s) can determine a distance to a friendly unit based on characteristics of signals received by the retrans vehicle(s) and/or retrans site(s). Such signals received can be intended for the retrans vehicle(s) and/or retrans site(s), or can be incidentally received based on other traffic in the area. Such characteristics can include a signal strength, location data transmitted with the transmission, a "ping" time between the devices, a calculated delay based on time data associated with a transmission, et cetera.

In embodiments a retrans vehicle can include a chassis to mount an existing radio apparatus and/or one or more antenna (e). Examples can include VRC and MRC mounts utilized in manned vehicles.

In embodiments, multiple retrans links can be provided to further limit detection of an emitting unit. For example, a first link can be to one or more ground-based antenna(s) or retransmitter(s). A wire or cable (or plurality of wires or cables) can be run from an emitting unit radio or computer to the ground antenna(s) and/or retransmitter(s), obviating the need for the unit originating the signal to emit a more-detectable signal. The ground antenna(s) and/or retransmitter(s) can then emit a signal to one or more retrans vehicles at a distance. In embodiments, the ground antenna (s) and/or retransmitter(s) can be configured to emit at a signal strength calibrated to provide reliable communications with retrans vehicles to reduce detectability or power consumption. In embodiments, the ground antenna(s) and/or retransmitter(s) can be configured to track one or more retrans vehicles, and provide a directed or directional signal to limit the observability or detectability of the signal. The one or more retrans vehicles can then emit the signal to additional retrans vehicles for relaying the signal or to one or more destination receiver(s).

In embodiments, load sites can be used to provide non-real time information or data to be transmitted at a distant location. For example, intelligence imagery, tactical site exploitation information, audio or video files of human intelligence efforts, et cetera, can be loaded to the memory of a retrans vehicle. Load sites can be wired to a retrans vehicle dock at a distance or be physical locations where personnel or other systems can interact with a retrans vehicle. A storage device can be couple with the retrans vehicle, or memory can be loaded into the retrans vehicle, to provide data (in some embodiments, large amounts of data) to the retrans vehicle. The retrans vehicle can then move to displace before broadcasting the transmissions. In embodiments a load site can be a retrans site itself, and transmission can be delayed until personnel or other systems depart the area.

In embodiments, an emitter can calibrate its signal strength for use with one or more retrans vehicles. The signal strength can be calculated to provide reliable communications with the one or more retrans vehicles. This can be based on, e.g., the location of the retrans vehicle, the retrans vehicle equipment, the transmission type, the transmission payload, and one or more interference factors. The location of the retrans vehicle can be known as described above, with the retrans vehicle operating at a location, in a zone, or according to one or more pre-programmed or dynamically determined routes or paths that are known to or determinable by the emitter based on the pre-programming, cryptographic information associated with the communications, and/or encrypted communications from the retrans vehicle. The retrans vehicle equipment can be known to emitters either by pre-programming or based on a transmission from the retrans vehicle (such as a check-in transmission). The transmission type can be a particular wavelength or frequency (or band/portion of the spectrum), as certain wavelengths or frequencies (or bands or portions of the spectrum) will be received more reliably. The signal payload can be, e.g., voice or coded audio such as morse code, or data, according to certain bandwidths and protocols. Lower-bandwidth signals may be transmittable at lower power, and signals that can be resolved even if received broken may be transmittable at lower power. For example, a broken voice signal may still be resolved, whereas a data signal missing packets may be unreadable.

In embodiments, a retrans vehicle launched by an entity other than an emitting entity can provide a check-in transmission to friendly units comprising standardized information (e.g., a check-in brief) and certain codes or challenges and passwords to provide secure handover of the retrans vehicle. The check-in brief can include details coordinating use of the retrans capability. This can include but is not limited to details on the retrans vehicle's path or location, capabilities, and, in embodiments, authenticating to the retrans vehicle so that it will retrans communications from the origin. In embodiments, a retrans vehicle going off station or otherwise departing can transmit a message to facilitate a handoff to other retrans vehicles.

In embodiments, retrans vehicle information can be pre-programmed in a shared secure database (which can be stored locally or accessed remotely) to facilitate handover of retransmission or repeater responsibilities, or integrate a new transmitter into a retransmission or repeater architecture. In embodiments, a unique identifier for a retrans vehicle can be provided such that an origin or use can identify a retrans vehicle, and information permitting communication therewith (e.g., key or handshake data, location data, reception and transmission frequencies, capability data, et cetera) can be stored in connection with the unique identifier, but the detailed information need not be transmitted over the network.

In embodiments, a retrans vehicle will retransmit all traffic received. In alternative embodiments, a retrans vehicle will retransmit only traffic encrypted or sent according to certain criteria, e.g., utilizing particular encryption, hopset, frequencies, including particular headers or other supplemental information, et cetera. In embodiments, a retrans vehicle In embodiments, a retrans vehicle can receive and retransmit a signal from an unmanned aerial vehicle. For example, a UAV can be used for observation or collection, to control fires, or to coordinate friendly action in proximity to a threat. To reduce detection and targeting of the UAV in proximity to the threat, the UAV may emit a direction signal, and/or an LPI/PLD signal, to the retrans vehicle, which may have higher survivability with a larger electromagnetic signal, or which may be attritable to preserve the UAV on-station to continue collection and/or control.

In embodiments, a signal origin or emitter can utilize a device or process to select a retrans vehicle or retrans site to complete a communication mission from a plurality of possible retrans vehicles and/or retrans sites. The device or process can include logic or an algorithm receiving inputs relating to location (of emitters, retrans sites or vehicles, and recipients), threat level, communication reliability and signal strength (similar to, e.g., the Systems Planning, Engineering and Evaluation Device (SPEED) software that can account for terrain and weather in communication architecture planning), urgency of the transmission (e.g., need for immediate receipt), importance of the transmission (e.g., significance of the transmission apart from urgency), other unit communications and network traffic, and other variables. These inputs can be weighted equally or unequally and one or more solutions can be determined to provide and implement a retrans plan. In embodiments, an algorithm can be utilized to determine a retrans solution. The algorithm can be operated at a signal origin, on one or more retrans vehicles, or at a centralized server or similar node, and the solution can be published securely to one or more signal emitters, retransmitters, and/or recipients to facilitate appropriate end-to-end communication.

In embodiments, emitters and/or retrans sites can automatically modulate transmission power based on conditions between emitters, retransmitters, and recipients, including distance, terrain, weather, electronic warfare or jamming considerations, et cetera. In some embodiments, sensors and map and weather data can provide input to determine estimated strength necessary to effect readable transmission. In some embodiments, a retrans vehicle or site, or a recipient, can broadcast back an indication of received signal quality. Based on whether the signal quality is excellent, sufficient, or insufficient, transmission power can be increased or decreased to minimize detectability and preserve battery. Because feedback is backpropagated from retrans sites and/or retrans vehicles or end recipients, this arrangement allows the origin or emitter to receive feedback to minimize exposure while accomplishing the communication mission without being exposed to additional risk.

In embodiments, a retrans vehicle or site that is on will retransmit any signal received, omnidirectionally or according to a specific direction assigned with its mission. In embodiments, a retrans vehicle or site will only selectively retransmit signals based on particular signal characteristics. In an embodiment, a retrans vehicle or retrans site can recognize signals being sent according to certain cryptographic protocols without the need to decrypt them, and can recognize friendly signals in that manner. In embodiments, a retrans vehicle or retrans site only retransmits signals received with a particular prefix or suffix appended. In embodiments, a retrans vehicle or retrans site only retransmits signals from a specific origin or emitter, or authorized origins or emitters. Keying a retrans vehicle or site to one or more emitters can use protocols different from those used in encryption of signal payloads to preserve COMSEC (e.g., obviate the need for sensitive encryption hardware or software to be located on a retransmitter). Alternatively one or more retrans sites can include cryptographic capabilities used to identify appropriate signals for retransmission, but can be designed to be tamper-resistant or tamper-proof and self-zeroize on occurrence of conditions indicating risk or compromise.

In embodiments, a retrans vehicle can change a security parameter of a transmission before retransmitting the received signal. For example, a different hopset can be adopted (e.g., the hopset on which the transmission is received can be different than the hopset employed when the transmission is retransmitted); the transmission can be re-encrypted according to a different encryption technique or key; the frequency band or transmission means can change (e.g., received on UHF, retransmitted on VHF), et cetera.

In embodiments, series of low detectability nodes can be used to retransmit a signal one or more times. A retrans site can receive a directionally focused (and/or other low-detectability) signal from an origin, then emit a directionally focused (and/or other low-detectability) signal to another retrans site, and so on. One or more retrans links can be used in this fashion to limit the observability of transmissions and limit the exposure of any link in the communications chain. In embodiments using two or more retrans vehicles or sites, each retrans vehicle or site need only have information pertaining to its target recipient, such that if a third retrans vehicle in a chain of retrans vehicles was compromised it would possess no information pertaining to anything other than the next retrans vehicle. While an area in which the preceding link may be deducible from the location and capabilities of a given retrans vehicle, the retrans vehicle need not possess any positive information regarding the location of a prior link in the chain. In embodiments, a retrans site or other node (e.g., origin, recipient) can be designated a manager of a series of retrans vehicles, and a constellation can be organized based on the retrans vehicles in communication with the manager and/or other nodes. In embodiments, a constellation of retrans vehicles can be configured to self-organize according to a shared algorithm or designation of one or more retrans vehicles as managers.

In embodiments, a retrans vehicle can facilitate firemission processing and even act as a sensor to adjust and deliver fires. In embodiments, one or both of a signal origin and a retrans vehicle can include a natural language processing engine configured to receive verbal calls for fire and convert the verbal calls for fire to digital information representative of the call for fire. In this way, a call for fire need not be loudly spoken, and the benefits of digital call for fire can be realized when observers or others executing firemissions cannot provide a digital call for fire. The natural language processing engine can be configured to recognize the transmissions of a call for fire and convert them to a digital call for fire. The natural language processing engine can include a readback mechanism to read back the transmissions as heard, or portions thereof, to confirm the firemission details. In embodiments, subsequent transmissions from the firing agency or a fire support center can be provided through the readback mechanism, such that the observer or executor transmitting can receive spoken (at least by the machine) messages to observer, approvals, modifications, denials, shot and splash calls, et cetera.

In embodiments, a retrans vehicle can be used as a sensor for adjusting fire onto a target. In embodiments, the retrans vehicle can include one or more cameras, thermal sensors, infrared sensors, et cetera, as well as a global positioning system, laser rangefinder, and/or other location technology to facilitate identifications of locations viewed using the sensors. In embodiments, a retrans vehicle can possess or access refined or mensurated "grids" (locations) to provide for accurate identification of locations viewed. During the conduct of a firemission, machine vision (or similar) algorithms can determine the location of impacts (e.g., by determining a center of a burst in an image, by determining the location where an impact or burst is first visible, by calculating an impact location based on visual markers as well as the distance and angle to impact (as well as other variables such as weather or environmental factors, terrain, munition, impact medium, et cetera), and other techniques). The retrans vehicle can then propose or provide adjustments to change the impact locations to improve munition effects on target. In embodiments, targets can be identified for adjust fire missions, and the retrans vehicle can provide semi-automatic or fully automatic adjustment of fires at a preset time or following a delay such that a fire unit will be laid and adjusted on a target for on-call fire for effect or other missions without the need for adjustment at a later time. In this manner, preplanned missions can be "staged" to obviate the need for active transmission on initiation of a firemission, and a retrans vehicle (or appropriate UAV or other unmanned observer) can send transmissions pertaining to adjustments, thereby reducing the risk to all units involved. Of course, a retrans vehicle described herein can still retransmit or repeat transmissions pertaining to firemissions with some or all of these enhanced sensor capabilities without departing from the scope or spirit of the innovation.

As used herein, a radio can (but need not) be a tactical radio, such as a PRC-117, PRC-148, PRC-150, PRC-152, VRC-90, VRC-91, VRC-92, VRC-103, VRC-110, MRC-145, et cetera. A radio can also be a software-defined or virtualized radio or networking device. A radio can also be a computer configured to send and/or receive signals using tactical networks, or to/from military, defense, law enforcement, civil authority, or similar agencies' systems. Such radios are listed for example purposes only, and should not be construed as in any way limiting the suitability or applicability of others. Radios can be the signal origin site, such as a unit sending a report where the original signal is created, any intermediary radio such as a retransmitter, and a destination radio receiving the signal. A signal can be any type of signal sent or received by radios, software-defined radios, or computers, such as voice transmissions, encoded audio transmissions such as morse code, or data transmissions. Radios herein can operate in any band or spectrum, and can be configured to communicate with other radios or antennae on the surface (e.g., ground-based or surface vessels), below the surface (e.g., submarines or submersible craft), in the air (e.g., manned or unmanned aerial vehicles), or in space (e.g., satellites). Radios herein can utilize or include capabilities such as, e.g., high frequency (HF) bands, very high frequency (VHF) bands, ultra-high frequency (UHF) bands, Single Channel Ground and Airborne Radio System (SINCGARS) technology, Mobile User Objective System (MUOS), mesh networks, et cetera. In embodiments, the internet or other data networks can be used. In embodiments, radios or related communication equipment herein can utilize or hijack existing commercial communications infrastructure to provide connectivity or communications links.

Various techniques herein can control retrans capabilities or a retrans vehicle or retrans site or elements thereof. Computer-readable instructions or logic (embodied on, e.g., a non-transitory computer-readable medium stored locally or hosted via a server, cloud, et cetera) when executed by a processor can perform operations or effectuate components facilitating aspects described herein. Various sensors can be incorporated into a retrans vehicle or site, or provide information locally or remotely, to provide input to the operations or components for dynamic use of systems and methods described herein. Such sensors can include but are not limited to location sensors (e.g., global positioning systems, triangulation systems, machine vision systems configured to perform terrain association, machine visions systems configured to navigate by celestial bodies, maps, et cetera), speedometers, accelerometers, gyroscopes, altitude heading and reference systems, radar sensors, cameras (e.g., visible light, thermal or infrared, image intensified, et cetera), thermal or temperature sensors, impact sensors, audio sensors, chemical sensors, pressure sensors, altitude sensors, flow sensors, liquid level sensors, electrical sensors, displacement sensors, force sensors, vibration sensors, clocks, tachometers, et cetera. In embodiments the instructions or logic control various actuators or physical controllers. In embodiments some portions of control are embodied on analog systems or circuits different from the arrangement above. Those of skill in the art will recognize various means for energizing, utilizing, and de-energizing systems disclosed herein on review of the disclosure, and so while various software and hardware control systems are not exhaustively detailed, variants are intended to fall within the scope and spirit of the innovations.

Systems employing techniques described herein are discussed below. While these systems may be discussed generally, they can utilize any of the aspects discussed herein in various combinations, and can be modified from their descriptions below to utilize alternative aspects described herein, without departing from the scope or spirit of the innovation.

Figure 2:
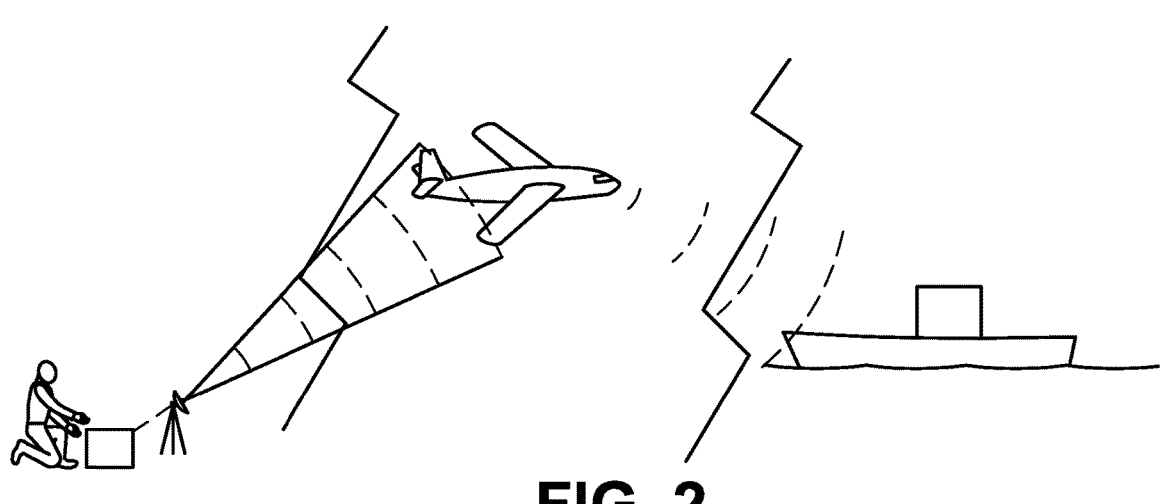
FIG. 2 illustrates an example of a retransmitter and its use as disclosed herein.

FIG. 2 illustrates an example of a retransmitter and its use as disclosed herein. An emitter can use a directional antenna to transmit a less-detectable signal to a UAV, which can then broadcast a wider or higher-strength signal that can be received by a distant recipient (e.g., a ship). In embodiments, a signal origin can be connected to the antenna broadcasting to the UAV with a wire to provide further standoff. In embodiments, the UAV can also use a directional broadcast toward a known recipient. Any of the embodiments herein can be utilized with the arrangement depicted, or the arrangement can be modified according to any embodiments described herein, without departing from the scope or spirit of the innovations. In alternative embodiments, the retrans vehicle can broadcast a low observability (e.g., directional, low power, and/or other type of) signal to limit its observability provided its recipient can receive the signal being broadcast.

Figure 3:
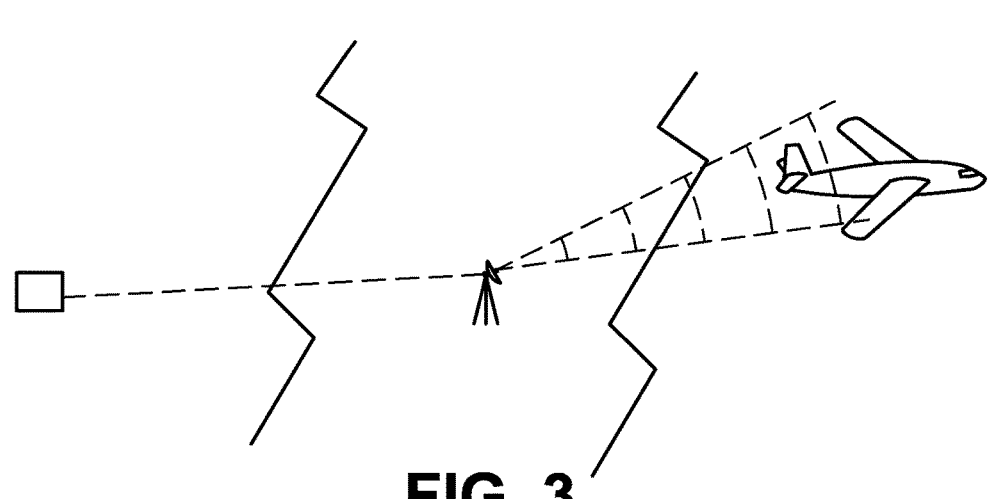
FIG. 3 illustrates an example of retransmitters and their uses disclosed herein.

FIG. 3 illustrates an example of retransmitters and their uses disclosed herein. FIG. 3 shows a distant arrangement between a signal origin (e.g., broadcasting unit) and a retrans site, which can be effected using a wired connection (or, in alternative or complementary embodiments, a low observability wireless signal). The retrans site can broadcast to a recipient or a UAV to chain various emitters and receivers, making traceability back to the signal origin more difficult and making targeting of communication links more complicated. Any of the embodiments herein can be utilized with the arrangement depicted, or the arrangement can be modified according to any embodiments described herein, without departing from the scope or spirit of the innovations.

Figure 4:
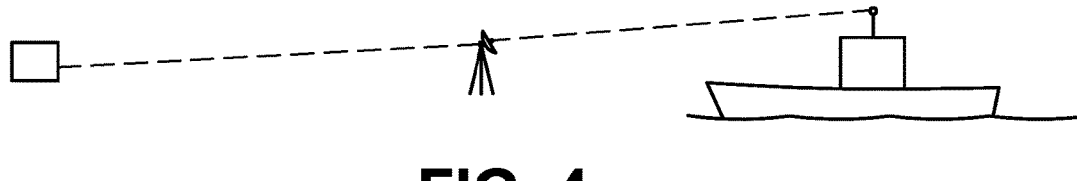
FIG. 4 illustrates an example of retransmitters and their uses as disclosed herein.

FIG. 4 illustrates an example of retransmitters and their uses as disclosed herein. A chain of retransmission sites and vehicles is shown, to include seaborne retrans vehicles. Any of the embodiments herein can be utilized with the arrangement depicted, or the arrangement can be modified according to any embodiments described herein, without departing from the scope or spirit of the innovations. The retransmission sites can variously use one or both of low observability signals and more observable (e.g., omnidirectional, higher power, et cetera) signals.

Figure 5:
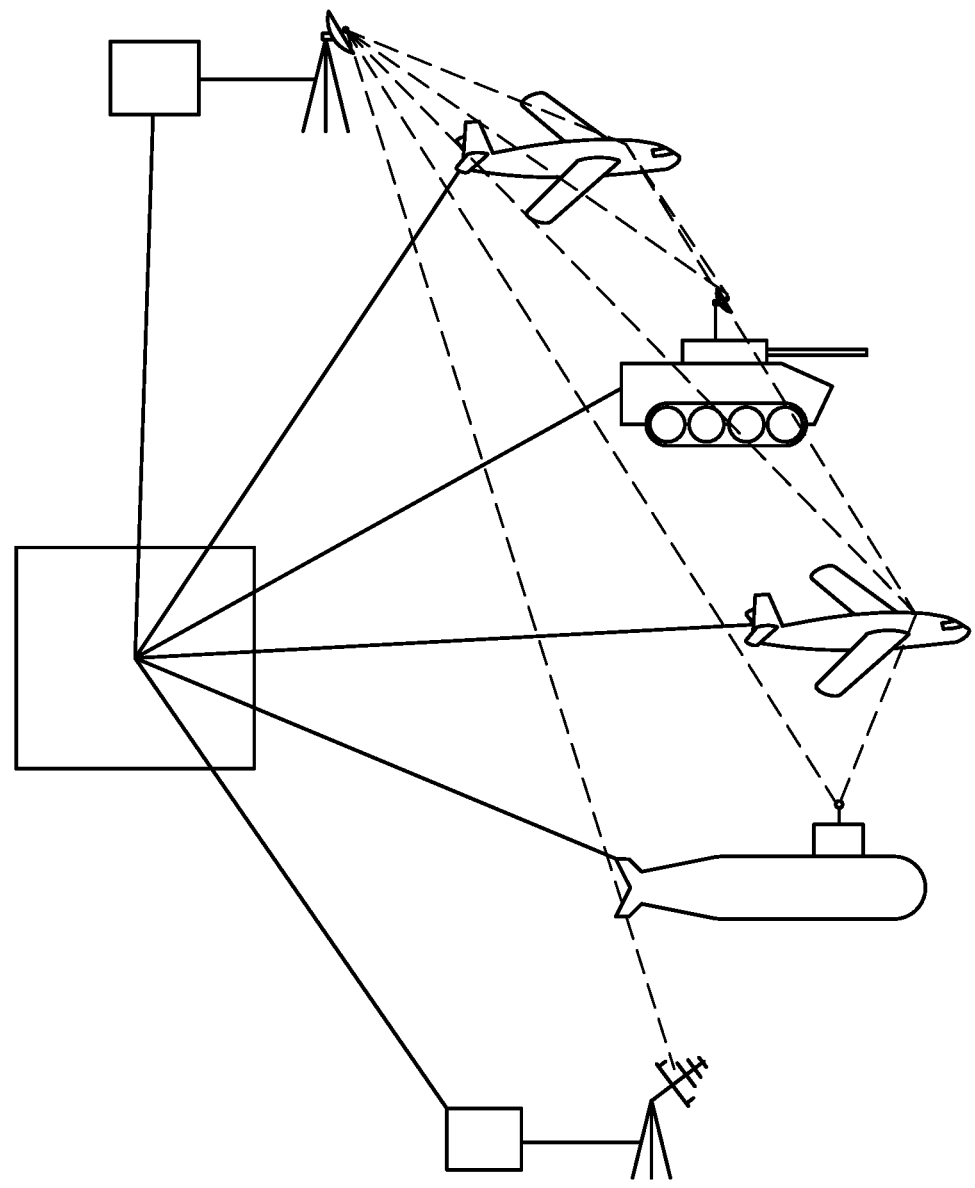
FIG. 5 illustrates an example of retransmitters and their uses disclosed herein.

FIG. 5 illustrates an example of retransmitters and their uses disclosed herein. In particular, FIG. 5 illustrates a constellation of retrans vehicles and sites. In embodiments, the signal origin can use communication links with one or all of the various antennae, UAVs, and land- or sea-borne vehicles carrying retransmission capabilities. One, two, or more of the retrans sites or vehicles can be available at a given time. In embodiments, two or more of the retrans sites or vehicles can be in communication with one another. This is depicted by dotted lines, although the particular sites and vehicles in communication with one another can vary, and sites or vehicles shown to be in communication need not be while sites or vehicles not shown to be in communication may be. In embodiments, communication from "active" or "live" retrans vehicles or sites can provide a heartbeat or check-in communication to verify they are still operational. "Inactive" or "dormant" vehicles or sites can receive these transmissions (or other transmissions or control signals) without transmitting, but energize to active or live given a condition (e.g., loss of heartbeat signal, no signal emitted for period of time, mayday signal, signal indicating another retransmitter is going dormant or recharging, express instruction to go online, et cetera). In this regard, a constellation of multiple retransmitters can be available singly or in combinations on time- or condition-based occurrences to provide, e.g., primary, alternate, contingency, and emergency (PACE) plan options for communication. In embodiments, the priority or order of retransmitter use in a constellation can be based on a variety of factors, such as transmission strength, range to emitter, range to recipient, survivability (e.g., detection and evasion systems or capabilities, radar signature, vulnerability to electronic warfare attack), detectability (e.g., radar or electromagnetic signature, whether device must be on a surface or at an altitude to function, et cetera), location, capability, latency, time to become operational (e.g., if dormant or located out of range of a recipient), et cetera. In embodiments, two or more retransmitters supporting the same communication mission can be active simultaneously to provide redundant communications to increase the likelihood of successful transmission, decrease the likelihood of disruption, and/or confound enemy targeting efforts. Any of the embodiments herein can be utilized with the arrangement depicted, or the arrangement can be modified according to any embodiments described herein, without departing from the scope or spirit of the innovations.

Figure 6:
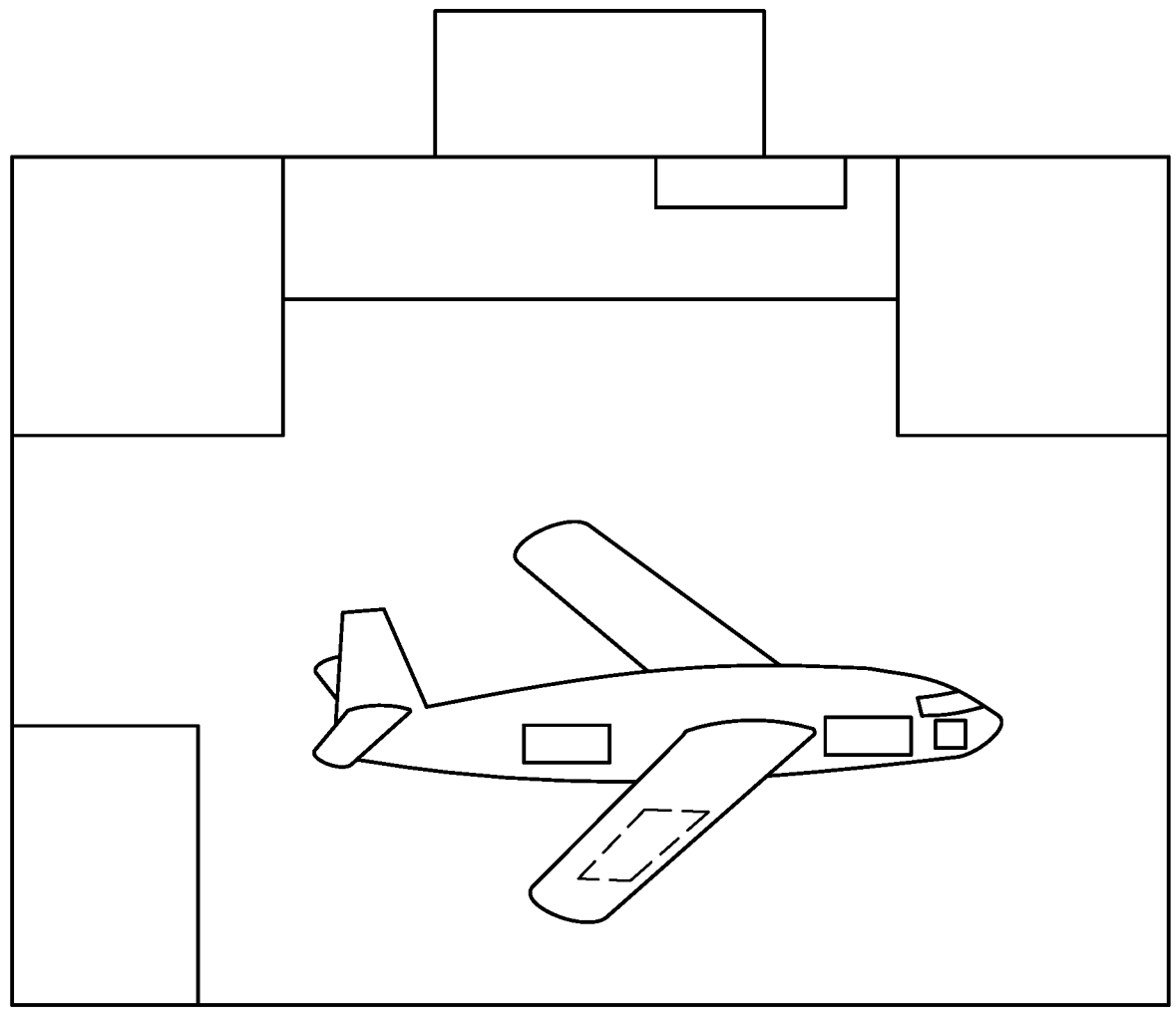
FIG. 6 illustrates an example of a cached retransmitter disclosed herein.

FIG. 6 illustrates an example of a cached retransmitter disclosed herein. A deployable cache box may be emplaced, airdropped, or contain its own mobility features (e.g., wheels, tracks, flight capability) to be prepositioned then be undetectable until it is in use. In embodiments designed for airdrop, one or more parachutes can be integrated. In embodiments, the cache box may have a means of detecting its height so that the parachute can break away when it is close to the ground, or the parachute can be released after the device touches down or stops moving.

The cache box can have a cache box battery which can be maintained or recharged by, e.g., solar panels or other renewable energy systems integrated into the cache box.

The cache box can have an antenna for receiving signals. In embodiments, the antennae can be stowed until the cache box is properly deployed, and the antenna can be deployed thereafter to prevent damage. The antenna can receive signals to be provided to a control module of the cache box, which can instruct a retrans vehicle to deploy from the cache box. Alternatively, a cache box could be a retrans site, and the antenna can receive a signal to instruct the retrans site to become operational after remaining dormant.

The cache box can include motorized armatures that are deployed after the cache boxes stops moving, devices to create centripetal force, or other components to allow the cache box to self-right after deployment. In alternative or complementary embodiments, various thrusters, inflatables, biasing, weighting, aerodynamic features, et cetera, can be used to ensure the cache is properly oriented following deployment. In this manner, a retrans site can be ensured to be properly oriented for antenna deployment and solar (or other) recharging, and a cache box containing a retrans vehicle can be ensured that the vehicle will be properly oriented for launch. In further embodiments, the control module of the cache box can be operatively coupled to sensors that detect, e.g., standoff from trees or terrain as well as overhead mask and clearance, and can reorient the cache box to a more favorable launch position or direction depending on the surrounding environment using the same mechanism(s) as those employed to self-right the cache box. In alternative or complementary embodiments, the payload (e.g., retrans vehicle) can automatically realign within the cache box regardless of the cache box's orientation (e.g., using a rotating internal housing and weighting, motors, et cetera) to ensure that the payload is usable regardless of cache box orientation.

In embodiments where a cache box has a retrans vehicle, the cache box can include a door or exit on one or more sides of the box. Various launch assist or ejection mechanisms can be integrated to assist a retrans vehicle with exiting the cache box, and, in the case of a UAV, launching to flight.

Retrans vehicles in a cache box can (but need not) include hardware and software for mobility and navigation, self-recharging or self-powering capabilities, one or more batteries or other power sources, a control module capable of controlling the retrans vehicle and managing the sending and/or the receiving of signals, various sensors, a communication module (or multiple communication modules) comprising one or more antennae, radios, et cetera.

The cache box may be arranged to facilitate launch (e.g., storing a retrans UAV on a ramp, vertically oriented, or oriented at a launch angle), and the self-right capability may orient the retrans box to provide a set angle (by, e.g., leveling the cache box) or environment-based angle (e.g., higher angle to clear nearby terrain).

Any of the embodiments herein can be utilized with the arrangement depicted in FIG. 6, or the arrangement can be modified according to any embodiments described herein, without departing from the scope or spirit of the innovations.

In embodiments, aspects disclosed herein can conform to particular standards, specifications, or interoperability options. For example, retrans systems herein can be compatible with Joint All-Domain Command and Control (JADC2) systems.

Methods employing techniques described herein are discussed below. While these methods may be discussed generally, they can utilize any of the aspects discussed herein in various combinations, and can be modified from their descriptions below to utilize alternative aspects described herein, without departing from the scope or spirit of the innovation.

Figure 7:
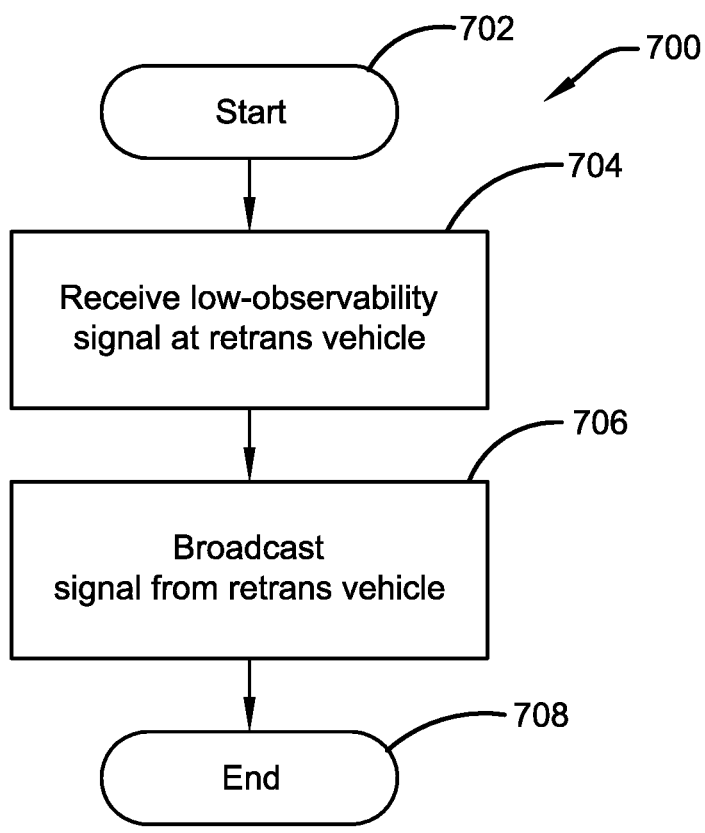
FIG. 7 illustrates an example methodology disclosed herein.

FIG. 7 illustrates an example methodology 700 disclosed herein. Methodology 700 begins at 702 and proceeds to 704 where a retrans vehicle can receive a low-observability signal. In embodiments, a handshake or other authentication or pairing can occur with an origin or emitter of the low-observability signal before receipt of the signal. The retrans vehicle can function as a retransmitter or repeater and, at 706, broadcast a signal including at least the payload of the low-observability signal to increase its range or reach (e.g., by broadcasting in an omnidirectional manner). In embodiments, the retrans vehicle can broadcast to another retrans vehicle or a specific recipient using a low observability communication technique or other technique (which need not be low observability). At 708 methodology 700 can end, or in the alternative recycle to other steps to continue functioning as a retransmitter, receiving and retransmitting or repeating other messages.

In embodiments, a preparatory method can occur before methodology 700 (or other methods described herein). Such a method can facilitate orienting an emitter employing a low observability signal on a zone or position of a retrans vehicle to increase the likelihood that the signal is properly received at the retrans vehicle. Orienting on the retrans vehicle can be a continuous process as the retrans vehicle moves in space, and can in embodiments utilize an automatically moving antenna that receives positional information based on actual retrans vehicle positional data, stored information relating to retrans vehicle locations or paths, or solving a function defining retrans vehicle travel. Such methods can proceed as set forth in this disclosure. A handshake, authentication, or pairing can also occur. Further, methods involving transmitting to a retrans vehicle can include steps for appending various transmission information to the transmission before or during broadcast in the event that the retrans vehicle is intended to behave in a certain manner based on the nature of the communication (e.g., delay; send at specific time; priority as, e.g., routine, priority, or urgent; send to a specific recipient; utilize a particular chain of retrans vehicles or sites in a chain; et cetera).

While methodology 700 and other methodologies and aspects of this disclosure describe retrans vehicles that receive low observability signals, it is understood that conventional signals can also be received and retransmitted (or handled in any other manner explicitly or implicitly described herein) without departing from the scope or spirit of the disclosure.

Figure 8:
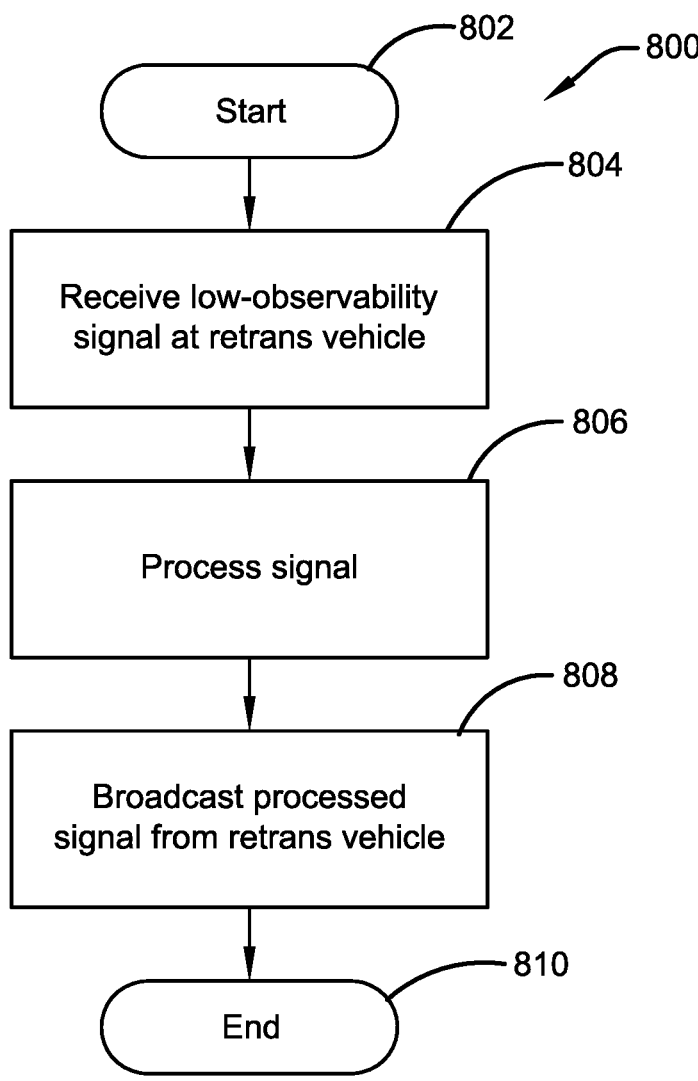
FIG. 8 illustrates an example methodology disclosed herein.

FIG. 8 illustrates an example methodology 800 disclosed herein. Methodology 800 begins at 802 and proceeds to 804 where a low-observability signal is received at a retrans vehicle. At 806, signal processing can occur on the received signal or information associated therewith. This can include, e.g., decryption, encryption or reencryption, interpretation of at least a part of the signal (and taking action based thereon), et cetera. The various techniques set forth herein for processing signals are not repeated herein in the interest of brevity, but other alternatives will be understood by those of skill in the art. At 808, a broadcast can be emitted from the retrans vehicle based on the processed signal. At 808, methodology 800 ends, or in the alternative recycles to other steps to continue functioning as a retransmitter, receiving and retransmitting or repeating other messages and optionally conducting signal processing on such messages.

Figure 9:
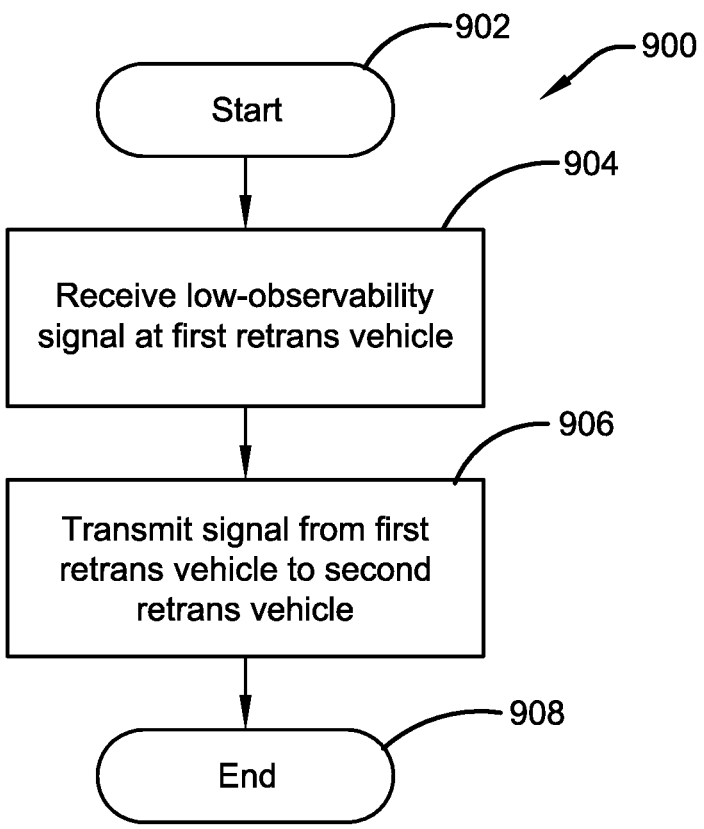
FIG. 9 illustrates an example methodology disclosed herein.

FIG. 9 illustrates an example methodology 900 disclosed herein. At 902 methodology 900 starts and proceeds to 904 where a low-observability signal is received at a first retrans vehicle. The first retrans vehicle can be a retrans vehicle in a chain of retrans vehicles (or sites). At 906, the first retrans vehicle can transmit at least the payload of the received signal to a second retrans vehicle (or retrans site, et cetera). The chain can continue, and the various retrans vehicles can continue handling message traffic, or methodology 900 can end at 908.

In embodiments, a signal transmission from a retrans vehicle (or other emitter) can be received by multiple recipients. In this regard, a signal transmitted to a second retrans vehicle from a first retrans vehicle may also be received by a first recipient within range of the first retrans vehicle, and a second recipient can receive the message after retransmission by the second retrans vehicle.

Figure 10:
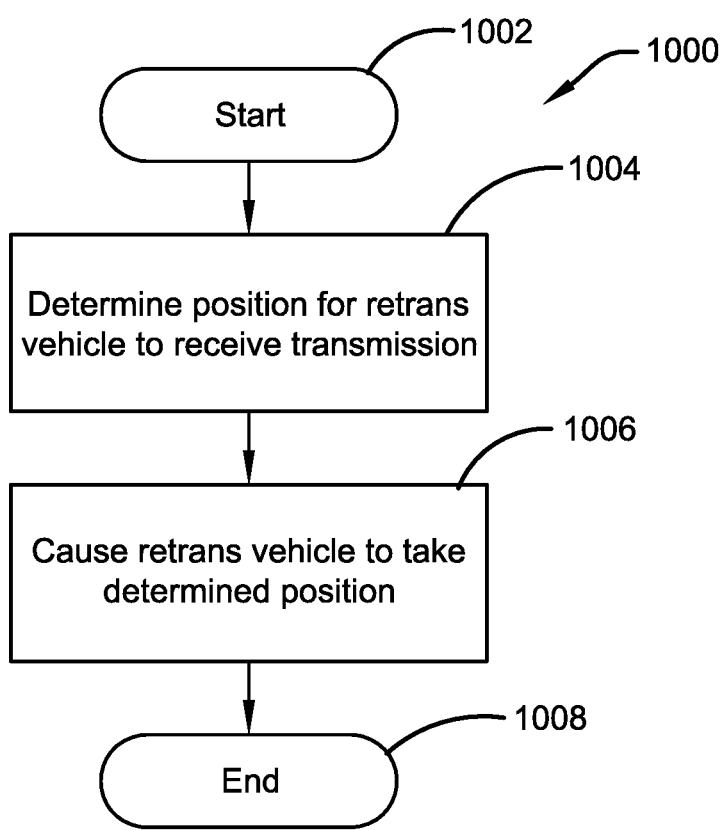
FIG. 10 illustrates an example methodology disclosed herein.

FIG. 10 illustrates an example methodology 1000 disclosed herein. Methodology 1000 begins at 1002 and at 1004 determines a position for a retrans vehicle to receive transmissions. In embodiments, the position can be defined by a function or plurality of functions, can be based on a preprogrammed path or routine, can be based on an express instruction or command, or any other positional technique (or combination of techniques) described herein. At 1006, methodology 1000 causes the retrans vehicle to take the determined position so that it can receive, e.g., directionally focused, low-power, or otherwise low observability traffic, or any other traffic. At 1008, methodology 1000 can end, or in the alternative return to other steps in methodology 1000 (e.g., to continue updating the position, to correct position after falling out of formation or behind schedule, et cetera). In embodiments, methodology 1000 can include various checks to determine whether a retrans vehicle is in its correct position, zone, or formation, or if the retrans vehicle is capable of maintaining correct position, zone, or formation at a current time or any future time. Various corrections or messages can be sent in response to such checks, including, e.g., verifying the retrans vehicle is in the correct position (at least to assist with communications troubleshooting), adjusting the retrans vehicle's travel to restore a correct position, facilitating a handover when a retrans vehicle is expected to or does go off station, et cetera.

Figure 11:
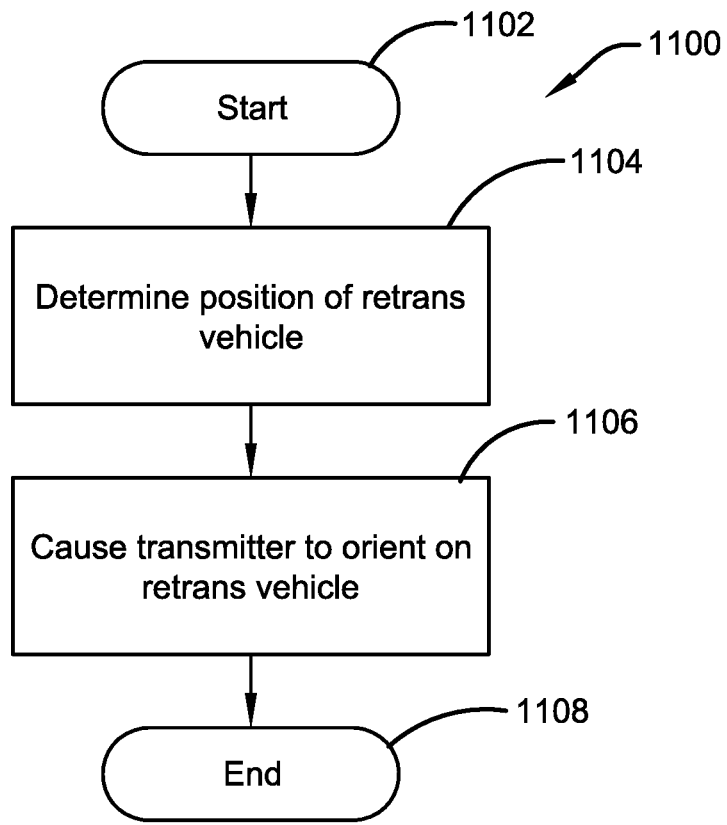
FIG. 11 illustrates an example methodology disclosed herein.

FIG. 11 illustrates an example methodology 1100 disclosed herein. Methodology 1100 can begin at 1102 and proceed to 1104. As discussed above, methodologies herein can cause transmitters to orient on a retrans vehicle. To do so, at 1104, a position of a retrans vehicle can be determined. This determination can provide, e.g., actual retrans vehicle positional data, position based on stored information relating to retrans vehicle locations or paths, or position based on solving a function defining retrans vehicle travel, et cetera. At 1106, methodology 1100 can cause the transmitter (or a portion thereof) to orient on the determined position of the retrans vehicle. This can be done in real-time, with periodic or continuous adjustment as the calculated location changes, or as the retrans vehicle's position is determined to be beyond a threshold or tolerance. For example, if the retrans vehicle is outside an acceptable angular tolerance, the transmitter may be adjusted again in embodiments where the transmitter does not remain in substantially continuous motion. Other adjustments can be made as well, such as increasing or decreasing output signal strength at the transmitter based on the distance to the retrans vehicle or other variables (e.g., environmental or meteorological conditions, signal traffic or interference, intervening terrain or obstacles, antenna type or damage to the antenna, et cetera). At 1108 methodology 1100 can end or recycle to other steps to continue tracking one or more retrans vehicles and orienting one or more transmitters thereon.

Figure 12:
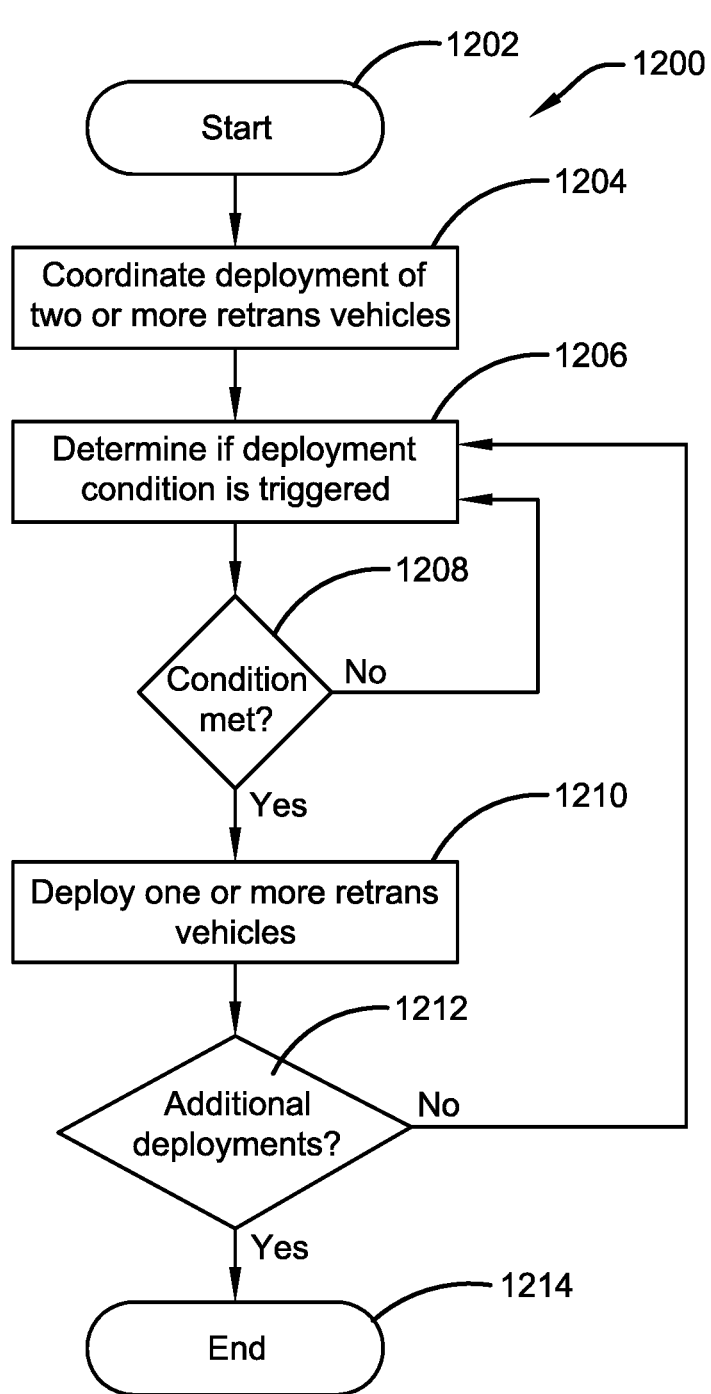
FIG. 12 illustrates an example methodology disclosed herein.

FIG. 12 illustrates an example methodology 1200 disclosed herein. Methodology 1200 can start at 1202 and proceed to 1204 where a system (e.g., software, circuitry, et cetera) coordinates deployment of a plurality of retrans vehicles. Methodology 1206 can determine one or more conditions associated with the deployment of one or more retrans vehicles. Such conditions can include, e.g., the need for geographic coverage, the need to specifically support retransmission or repeater service for one or more emitters or units, another retrans vehicle going off station (e.g., powering down for recovery, maintenance, or to reduce detectability; total or partial combat loss; low battery or fuel; et cetera). Methodology 1200 monitors for this condition at 1208 and makes a determination whether the condition is met. If no, methodology 1200 can continue monitoring. If the determination at 1208 returns positive, methodology 1200 can proceed to 1210 and cause one or more retrans vehicles to deploy. Causing a retrans vehicle to deploy can, in embodiments, include specific instructions for the retrans vehicle to execute a particular routine or use particular functions to determine locations and paths, cryptography to use, handshake or authentication techniques, or other options. At 1212 a determination is made as to whether additional deployments may be coordinated. If the determination at 1212 returns positive, methodology 1200 can recycle to continue monitoring for one or more triggering conditions. If the determination at 1212 returns negative, methodology 1200 can proceed to end at 1214.

While this disclosure focuses on military applications, it will be understood that various other applications can be employed where there is a need to conceal the origin of signals or confound an unwelcome party. For example, private actors who may be vulnerable to industrial sabotage may wish to employ techniques such as those described herein so that competitors or belligerent state actors are unable to compromise their personnel or systems. In another example VIPs such as heads of state, business leaders, or celebrities may wish to utilize these techniques to avoid tracking. Likewise, using an offset signature could assist at-risk people, such as to provide safety for people with stalkers, criminal witnesses or informants, et cetera.

The invention claimed is:

1. An unmanned aerial vehicle comprising:
   a navigation system configured to:
      calculate a position in space based at least in part on an encryption key, and
      cause the aerial vehicle to travel to the position at a specified time, wherein the position facilitates reception of a low observability signal from a remote emitter;
   a signal receiver configured to receive a low observability signal from the remote emitter at the position at the specified time, wherein the low observability signal includes a transmission payload; and
   a transmitter configured to retransmit at least the transmission payload.

2. The unmanned aerial vehicle of claim 1, wherein the position is a zone defined as a volume in three dimensions.

3. The unmanned aerial vehicle of claim 1, wherein the position is defined at least in part by a mathematical function.

4. The unmanned aerial vehicle of claim 1, wherein the signal receiver is configured to orient on the remote emitter.

5. The unmanned aerial vehicle of claim 1, comprising:
   an authentication module configured to pair with the remote emitter before retransmitting at least the transmission payload.

6. The unmanned aerial vehicle of claim 1, wherein the low observability signal includes a header, and wherein the aerial vehicle is configured to change one or more parameters of the traveling or the retransmitting based on the header.

7. The unmanned aerial vehicle of claim 6, wherein the transmitter retransmits the transmission payload to at least a target destination based on the header.

8. The unmanned aerial vehicle of claim 1, wherein the unmanned aerial vehicle is configured to transmit details regarding capabilities of the unmanned aerial vehicle to at least the remote emitter.

9. The unmanned aerial vehicle of claim 1, wherein the unmanned aerial vehicle is configured to transmit, to at least the remote emitter, details regarding the unmanned aerial vehicle leaving a position where it can retransmit for the remote emitter.

10. The unmanned aerial vehicle of claim 1, wherein the transmission payload is transmitted to a different retransmission vehicle.

11. The unmanned aerial vehicle of claim 1, wherein position is dynamic, and wherein retransmission ceases if the position is less than a friendly offset distance from the remote emitter.

12. A method, comprising:
calculating a position in space based at least in part on an encryption key, and
causing an unmanned aerial vehicle to travel to the position at a specified time, wherein the position facilitates reception of a low observability signal from a remote emitter;
receiving, using a signal receiver of the unmanned aerial vehicle, a low observability signal from the remote emitter at the position at the specified time, wherein the low observability signal includes a transmission payload; and
retransmitting, using a transmitter of the unmanned aerial vehicle, at least the transmission payload.

13. The method of claim 12, wherein the position is defined at least in part by a mathematical function.

14. The method of claim 12, comprising:
orienting the signal receiver on the remote emitter.

15. The method of claim 12, comprising:
pairing with the remote emitter before retransmitting at least the transmission payload.

16. The method of claim 12, comprising:
changing one or more parameters of the traveling or the retransmitting based on a header, wherein the low observability signal includes the header.

17. The method of claim 12, comprising:
transmitting details regarding capabilities of the unmanned aerial vehicle to at least the remote emitter.

18. The method of claim 12, comprising:
transmitting to at least the remote emitter details regarding the unmanned aerial vehicle leaving a position where it can retransmit for the remote emitter.

19. The method of claim 12, wherein one or more of the position in space and the specified time are based at least in part on a hopset.

20. The method of claim 12, wherein the position is one of a plurality of calculated positions each corresponding to a plurality of specified times.

* * * * *